INVENTOR
Paul L. Hexter,
BY
ATTORNEYS

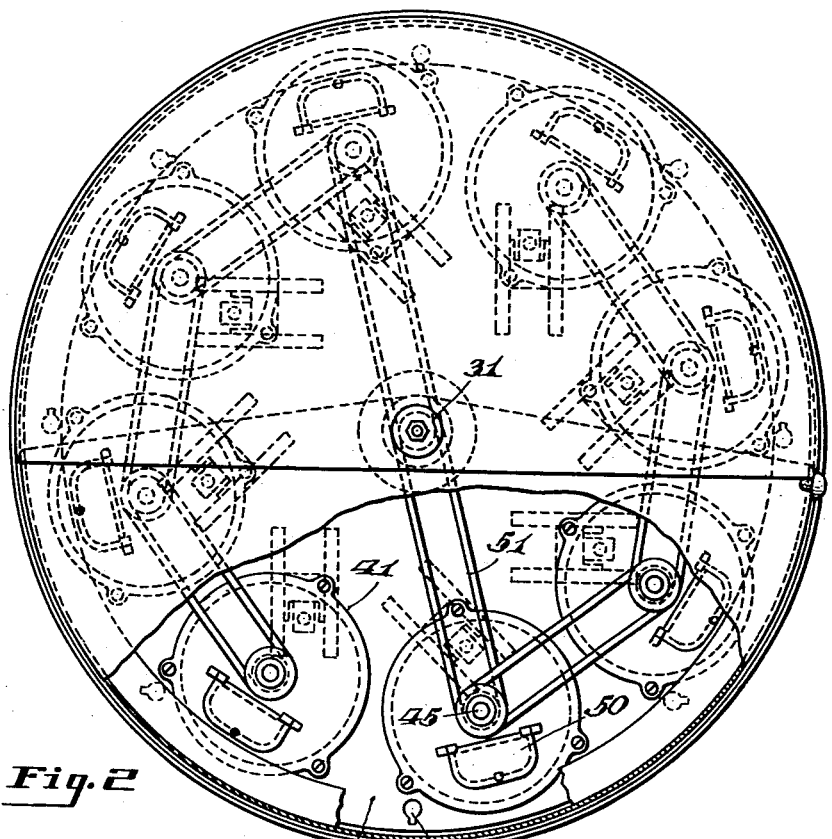
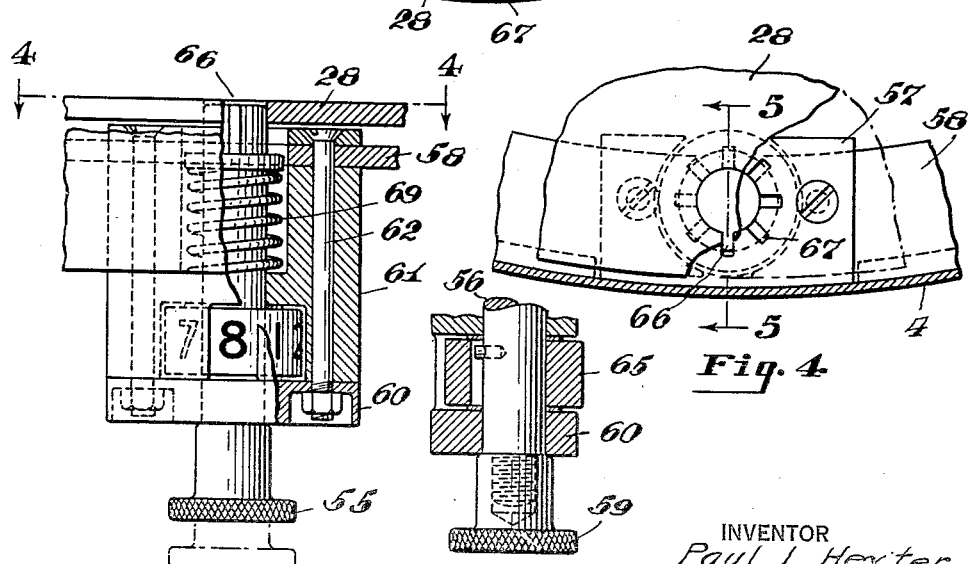

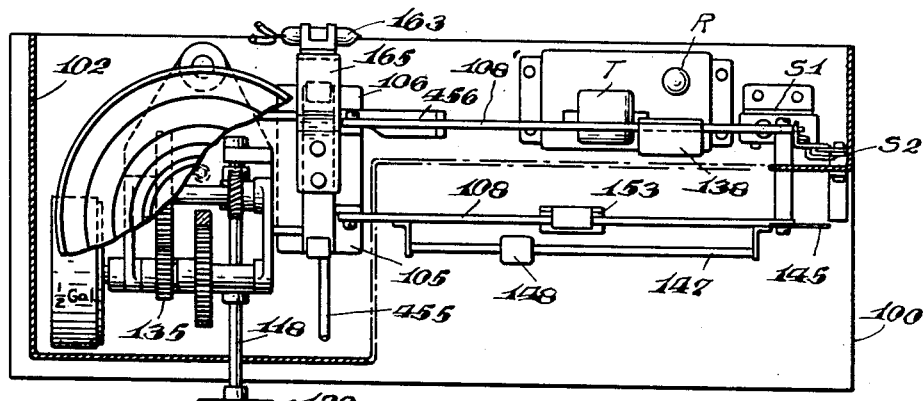
Fig. 11
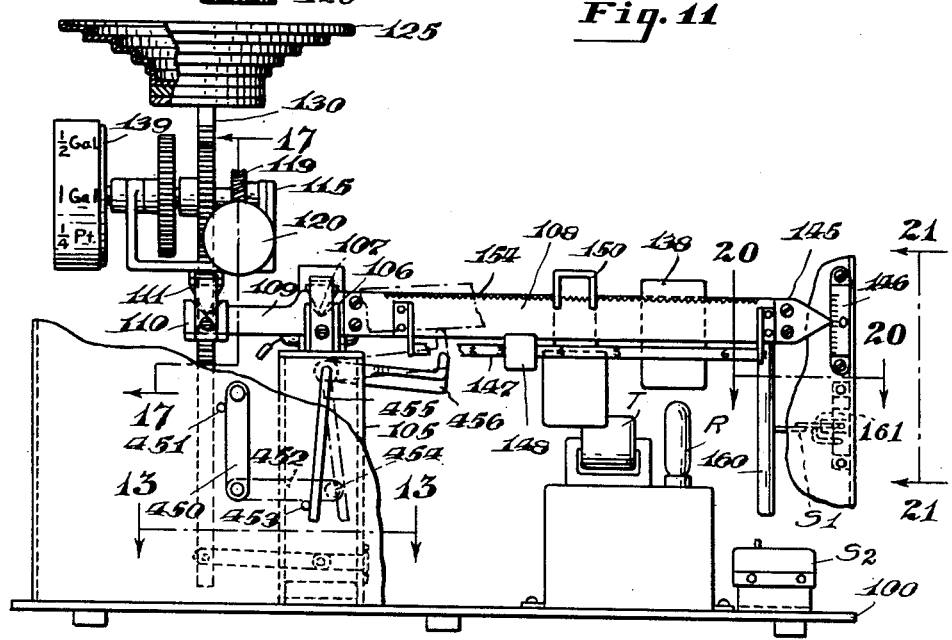
Fig. 12
Fig. 13
Fig. 14
Fig. 15
INVENTOR
Paul L. Hexter,
BY
ATTORNEYS April 24, 1945. P. L. HEXTER 2,374,430
PAINT DISPENSING APPARATUS
Filed Sept. 17, 1943 10 Sheets-Sheet 6
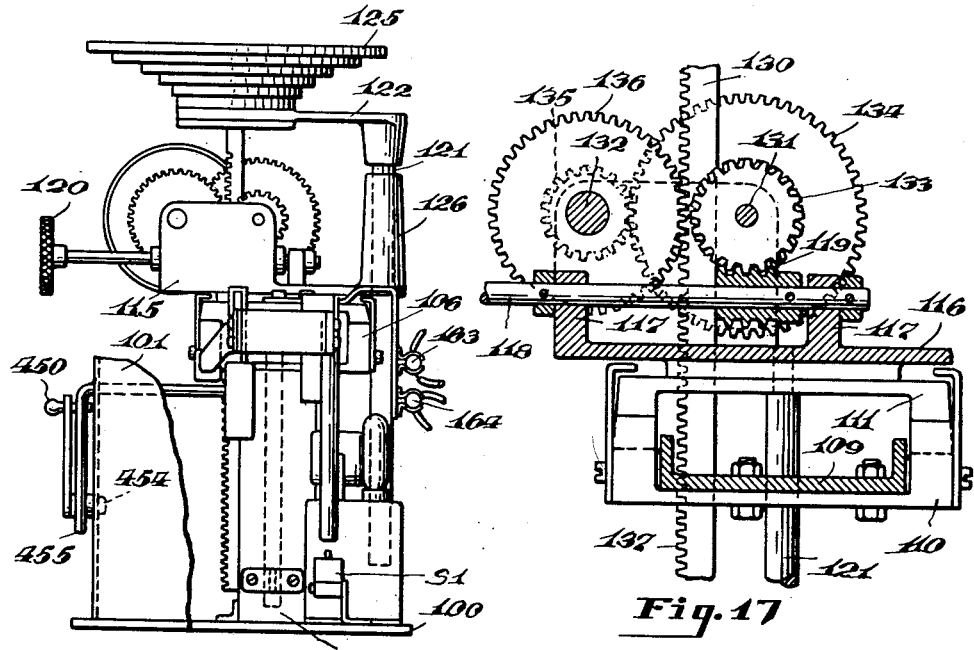
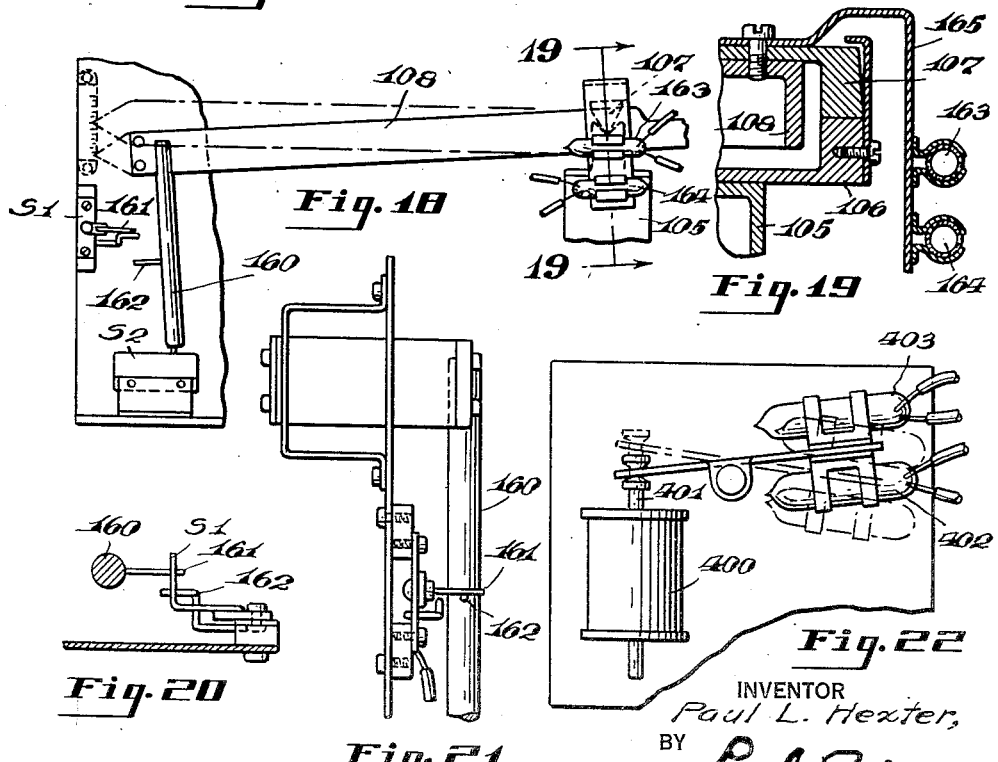
INVENTOR
Paul L. Hexter,
BY
ATTORNEYS April 24, 1945.  P. L. HEXTER  2,374,430
PAINT DISPENSING APPARATUS
Filed Sept. 17, 1943  10 Sheets-Sheet 7
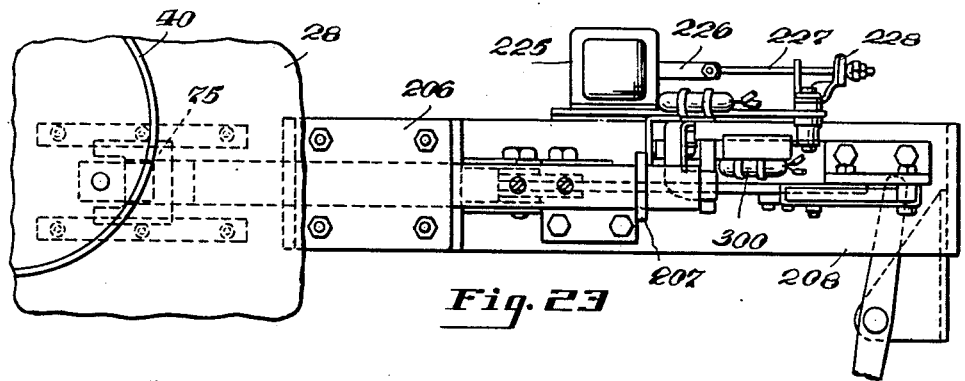
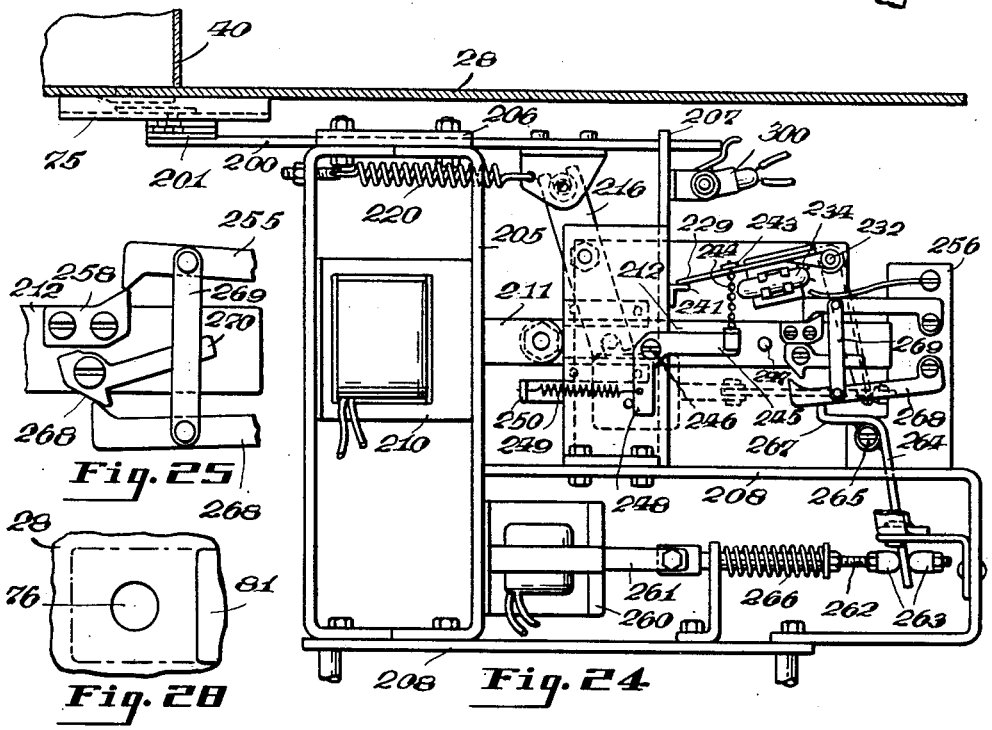
INVENTOR
Paul L. Hexter,
BY
ATTORNEYS April 24, 1945.                P. L. HEXTER                2,374,430
                         PAINT DISPENSING APPARATUS
                       Filed Sept. 17, 1943      10 Sheets-Sheet 8
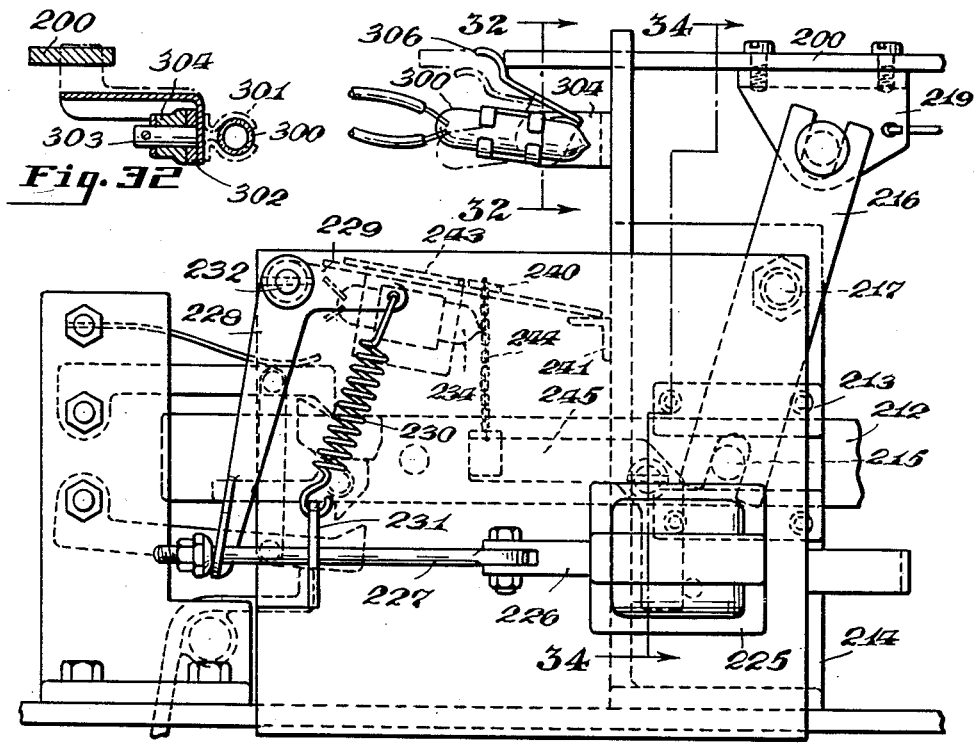
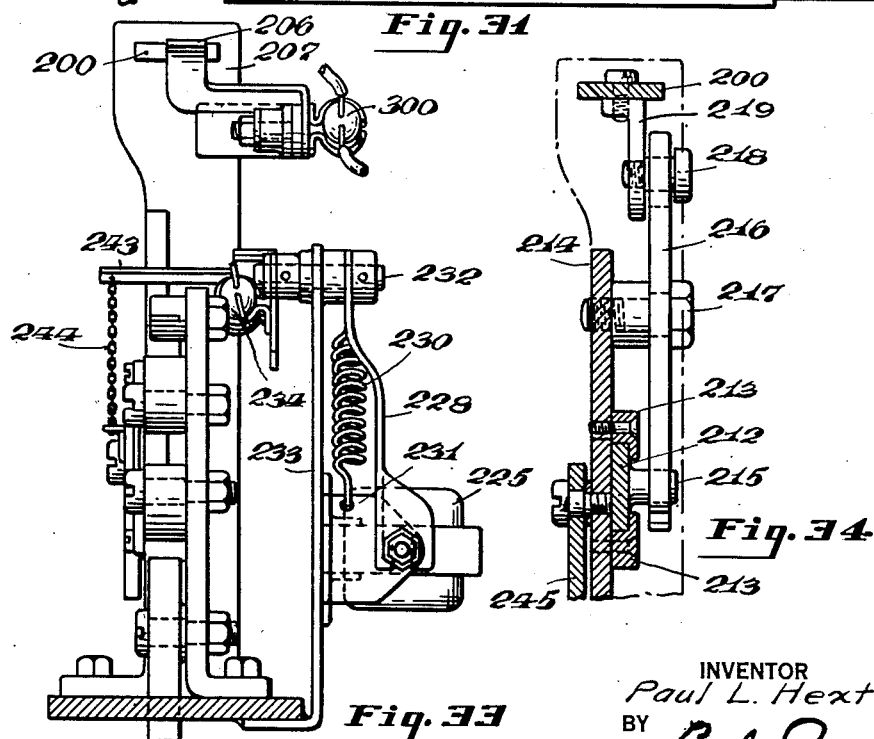
INVENTOR
Paul L. Hexter,
BY
ATTORNEYS April 24, 1945. P. L. HEXTER 2,374,430
PAINT DISPENSING APPARATUS
Filed Sept. 17, 1943 10 Sheets-Sheet 9

INVENTOR
Paul L. Hexter,
BY
ATTORNEYS

Patented Apr. 24, 1945

2,374,430

UNITED STATES PATENT OFFICE 2,374,430

PAINT DISPENSING APPARATUS

Paul L. Hexter, Cleveland, Ohio, assignor to The Arco Company, Cleveland, Ohio

Application September 17, 1943, Serial No. 502,825

16 Claims. (Cl. 249—14)

This invention relates to a paint dispensing apparatus and, more particularly, to a machine for mixing paint or lacquer in definite quantities.

The main object of the invention is to provide a structural unit in which are arranged a plurality of containers containing base colors with means for dispensing these colors from their containers in such a manner that any desired quantity of a blended color will be automatically dispensed and mixed in a separate container.

While the invention is applicable for any desired use, it finds particular advantage in service stations and repair shops where automobile bodies are repainted. It is apparent that it would be a physical impossibility for an automobile body shop to stock containers of all the different colors and shades used on the whole series of automobiles now in use. Furthermore, even if this were practicable, it is well known that cans of ready mixed paints after they have been once opened deteriorate and many times change color. It is, therefore, of great advantage for the body repainter to have at his command a machine which will mix small quantities of any desired shade of paint or lacquer for refinishing automobile bodies or repairing the same after accidents.

There is now available for use by body refinishers a series of charts which give the quantities by weight of the base paints, which when mixed together produce the desired shade and, consequently, it is essential in making up these small quantities of a particular shade to have a machine or apparatus which will very accurately dispense the base colors and mix them in a container for use.

Various proposals have been made for accomplishing this object and several machines have appeared which partially solved the problem. An illustration of a paint dispensing apparatus which has met with considerable commercial success is shown in my prior Patent No. 2,094,702, dated October 10, 1937. Here a stand is constructed for holding a plurality of containers of base colors with cut-off valves to accurately control the material therefrom into a receptacle. The quantities of base materials are quite accurately measured by using a gauge of the type described in my Patent No. 2,098,963, dated November 16, 1937, and the quantities dispensed are determined by means of the quantitative charts which have been worked out and above referred to.

These prior apparatuses, while useful and practical, have a number of disadvantages and it is the purpose of the present improved semi-automatic dispensing apparatus to overcome these unfavorable aspects. In using the present machine it is possible for the operator to deposit into a can measured quantities of the several base colors with the assurance that the colors will be dispensed so accurately that the resultant paint mixture will be the precise shade desired.

This apparatus for carrying out the invention may be divided into three correlated groups of elements including first, a turntable supporting a plurality of storage reservoirs holding the different base colors. These reservoirs are provided with power-driven stirrers and bottom dispensing valves in combination with means for rotating the turntable to a position above a service can where the paint in the reservoir may be dispensed with great accuracy and ease. Secondly, the apparatus includes a can holding and raising mechanism mounted on a sensitive weighing balance with electrical means in combination therewith for controlling the flow of liquid from the base color reservoir. Thirdly, the apparatus includes a dispensing valve operating mechanism for precisely controlling the flow of material from the base color containers with means for progressively closing the valve in combination with a safety manual positive closure therefor.

In the drawings:

Fig. 2 is a plan view of the machine shown in Fig. 1 with parts of the top cover broken away to show the agitating mechanism and paint reservoirs;

Fig. 4 is a plan view of the color selecting device taken on the line 4—4 of Fig. 3;

Fig. 5 is a fragmentary sectional view taken on the line 5—5 of Fig. 4;

Fig. 11 is an enlarged top plan view of the measuring scale or weighing device;

Fig. 12 is a front elevational view of the weighing device;

Fig. 13 is a fragmentary plan view taken on the line 13—13 of Fig. 12 showing the stabilizing link;

Fig. 14 is a front elevational view of a typical scale weight or rider;

Fig. 15 is a vertical sectional view taken on the line 15—15 of Fig. 14;

Fig. 16 is an end elevational view of the weighing mechanism shown in Fig. 12;

Fig. 17 is an enlarged elevational view of the container platform raising and lowering mechanism of the weighing or measuring device as viewed from line 17—17 in the direction of the arrows of Fig. 12;

Fig. 18 is a rear elevational view of the scale beam showing the associated circuit makers and breakers;

Fig. 19 is an enlarged elevational view taken on the line 19—19 of Fig. 18;

Fig. 20 is an enlarged plan view of the sensitive scale operated switch of the weighing device as viewed from the line 20—20 of Fig. 12;

Fig. 21 is an enlarged elevational end view of the scale switch shown in Fig. 20;

Fig. 22 is a detail view of the relay for operating the mercoid switches;

Fig. 23 is a fragmentary plan view of the valve operating mechanism;

Fig. 24 is a side elevational view of the valve operating mechanism shown in Fig. 23, with the valve shown in the closed position;

Fig. 25 is a fragmentary detail view showing the action of the dogs or stops for limiting the size of stream being dispensed;

Fig. 26 is an enlarged bottom plan view of one of the dispensing valves;

Fig. 27 is a sectional view through the dispensing valve taken on the line 27—27 of Fig. 26;

Fig. 28 is an enlarged view of the dispensing valve opening with the valve slide at the extreme open limit position;

Fig. 29 is a view similar to Fig. 28 showing the position of the slide for the restricted medium stream;

Fig. 30 is a plan view of the opening similar to Fig. 28 showing the position of the slide for the restricted fine stream;

Fig. 31 is an enlarged elevational view of the valve operating mechanism, showing the opposite side to that shown in Fig. 24;

Fig. 32 is a fragmental sectional view taken on the line 32—32 of Fig. 31, showing the mercoid switch and pivot therefor;

Fig. 33 is an end view of the valve operating mechanism as viewed from the left side of Fig. 31;

Fig. 34 is a vertical sectional view showing the valve operating lever taken on the line 34—34 of Fig. 31;

Fig. 38 is a wiring diagram of the electrical system for operating and controlling the machine.

Figure 1:
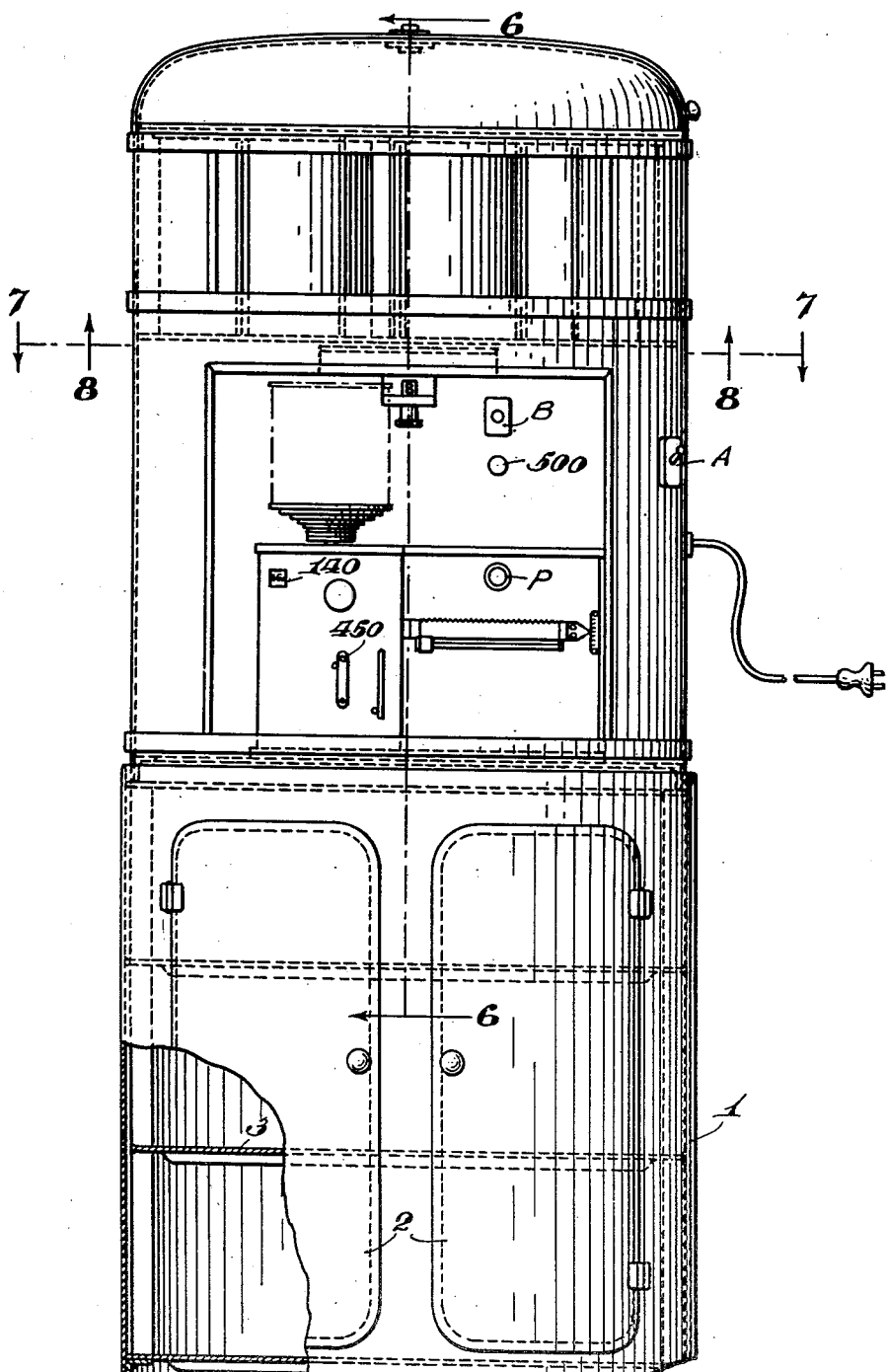
Fig. 1 is a front elevational view of a paint dispensing machine.

The dispensing machine as a whole is carried on a ground supported casing base 1, having lower doors 2 and storage shelves 3. The detachable upper casing 4 contains the dispensing mechanism per se and is mounted on a platform 5 secured to an inner flange 6 fastened within the upper edge of the lower casing 1.

Centrally located within the upper casing 4 is a vertical power shaft 10 held in lower bearing 11 mounted on a base plate 12 which is mounted in turn on a plate 13 supported on platform 5 and intermediate cushion 14. The vertical shaft 10 is enclosed throughout the major portion of its length in a tubular casing 20 having an annular flange 21 at its lower end in contact with a horizontal supporting plate 22 mounted on vertical rods 23 which rest on plate 13. This outer casing 20 is provided with an annular shoulder 25 carrying a ball bearing 26 for supporting an upper flanged cylindrical member 27 on which is mounted a rotatable horizontal paint reservoir carrying platform 28.

Figure 6:
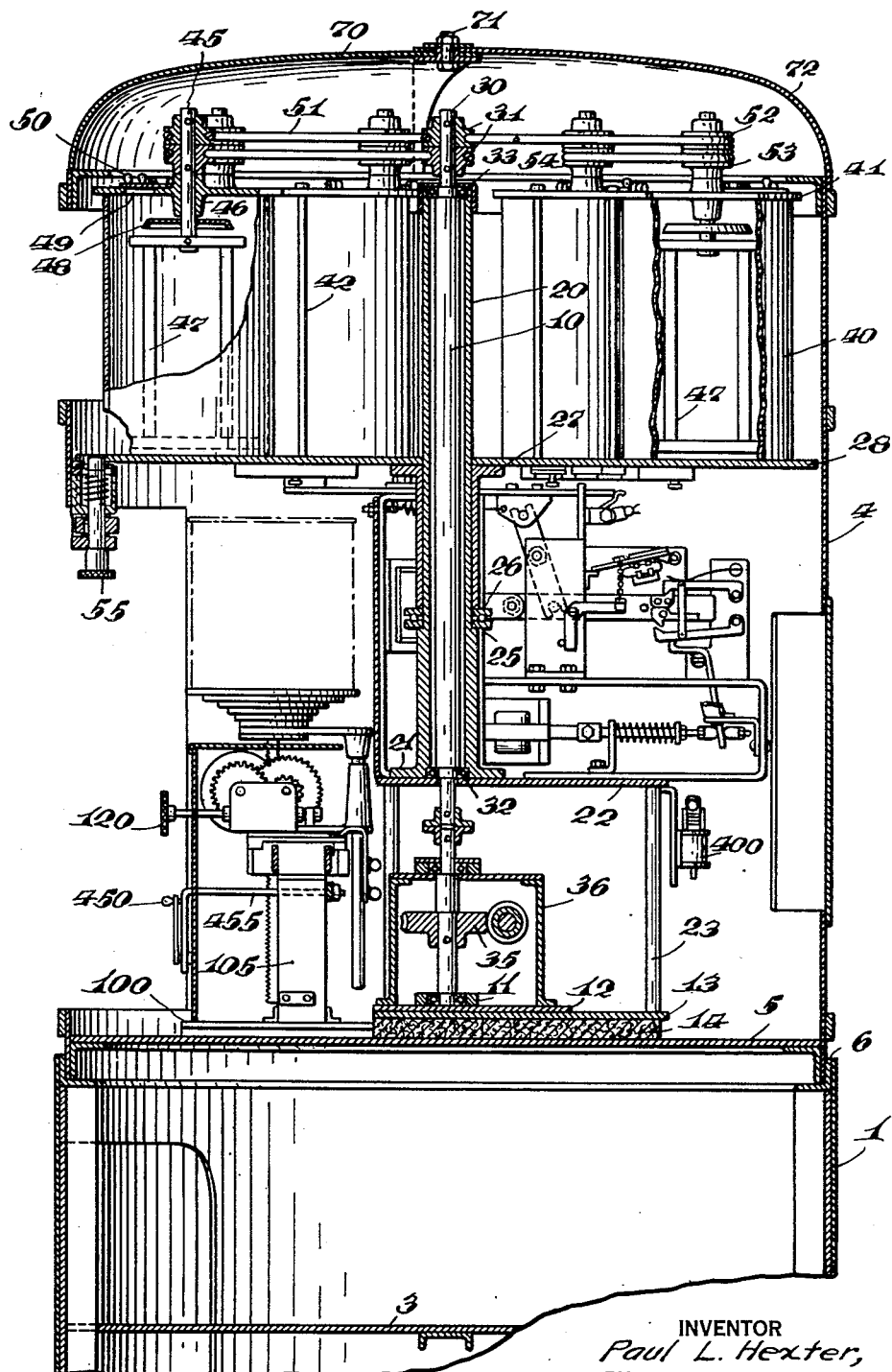
Fig. 6 is an elevational view of the upper portion of the machine in section taken substantially on the line 6—6 of Fig. 1.

The central shaft 10 in the tubular casing 20 is reduced in diameter at its upper end 30 for carrying drive pulleys 31 secured thereto by any suitable means. Vertical alinement of the shaft 10 within the outer casing is maintained by upper and lower bearings 32 and 33, respectively. Rotary movement is imparted to the shaft 10 through lower worm gearing 35 driven by motor M, the worm gearing being housed in lower casing 36 resting on base plate 12. As shown particularly in Figures 2 and 6, a series of glass base color paint reservoirs 40 are mounted on the horizontal plate 28 and a liquid tight engagement with the plate is secured by bolting the cover plates 41 of each color reservoir to the plate through the medium of vertical bolts 42.

In the accompanying drawings, applicant has shown a machine in which eight reservoirs are used for holding seven different base colors and an additional container for holding a dryer inasmuch as this has been found to be a practical number of base colors for most purposes, although it will be understood that any desired number of reservoirs may be installed. Each of the glass color reservoirs 40 is provided with an agitating or stirring device which receives rotation at all times when the machine is in use. Specifically, the stirring mechanisms for the reservoirs 40 comprise vertical depending shafts 45 bearinged in bosses 46 formed centrally in the cover plates 41. A plurality of dasher blades or stirring paddles 47 are mounted on the lower end of each shaft 45 and extend adjacent the bottom of the containers so that all portions of the coating material in the containers are thoroughly and constantly agitated and mixed when the stirring shafts 45 are rotated. It is preferable to affix a circular splash plate 48 between the boss 46 and dasher paddle to prevent any material from contacting the top of the container and possibly being forced out of the filling opening 49 and pivoted filler cap 50.

As clearly shown in Figure 2, drive belts 51 connect the drive pulleys 31 on the upper end of shaft 10 to oppositely positioned reservoirs 40 to rotate pulleys 52 secured to the vertical shafts 45 of the agitating paddles of each reservoir 40. Additional drive pulleys 53 are also affixed to the shafts 45 over which are run drive belts 54 passing around corresponding drive pulleys on adjacent reservoirs. Thus, it will be understood that two oppositely placed reservoirs are positively driven from vertical shaft 10 and movement is given half the series of mixing blades by the double pulley arrangement that transmits rotary motion from one reservoir to the next adjacent reservoir.

The horizontal reservoir supporting plate 28 connected on flanged member 27 carried on ball bearing 26 is capable of relative rotation by unlatching the vertical spring-projected detent or key 55 mounted in the open front portion of the casing 4. The bolt of the detent is carried by horizontal plate 57 supported by horizontal ring 58 secured to the inner face of casing 4. The bolt member 56 of the detent is provided with a knurled fingerpiece 59, the upward movement of which is limited by the spaced lower bridge member 60.

An H-shaped member 61 is carried between ring 58 and bridge member 60 on bolts 62. (See Figure 3.) Surrounding bolt 56 and lying in the open lower portion of the H-member 61 is a cylinder 65 carrying indicia such as symbols or numbers corresponding to the several storage reservoirs 40. This indicating ring 65 turns with the bolt 56 when the bolt is rotated by fingerpiece 59 and shows through an opening made in the front depending edge of the upper portion of the casing.

The head or free end of the bolt 56 is provided with an integral key 66 for complementary engagement with the plurality of openings 67 formed in the horizontal plate 28 adjacent each of the storage containers. These openings 67 have offset elongated channels corresponding to the numerals on the ring 65 for selective engagement with the key 66 on the bolt so that when it is desired to dispense material from any one of the storage tanks, the plate 28 is rotated to the front dispensing position, as will be hereinafter described, after the bolt which is normally projected through the openings in the plate by means of coil spring 69 surrounding the bolt has been withdrawn from its position in one of the openings in plate 28 and thereafter reinserted in the opening adjacent the storage reservoir it is desired to dispense from.

It may be said in passing that access is had to the series of storage reservoirs 40 by rotating the semi-circular pivoted front cover member 70 mounted on upper bolt 71 secured through the rear fixed portion 72 of the cover which is attached to the upper casing 4.

Figure 9:
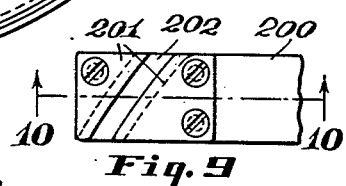
Fig. 9 is a fragmentary view of the end of the valve operating bar.
Figure 10:
Fig. 10 is a sectional view taken on the line 10—10 of Fig. 9.
Figure 8:
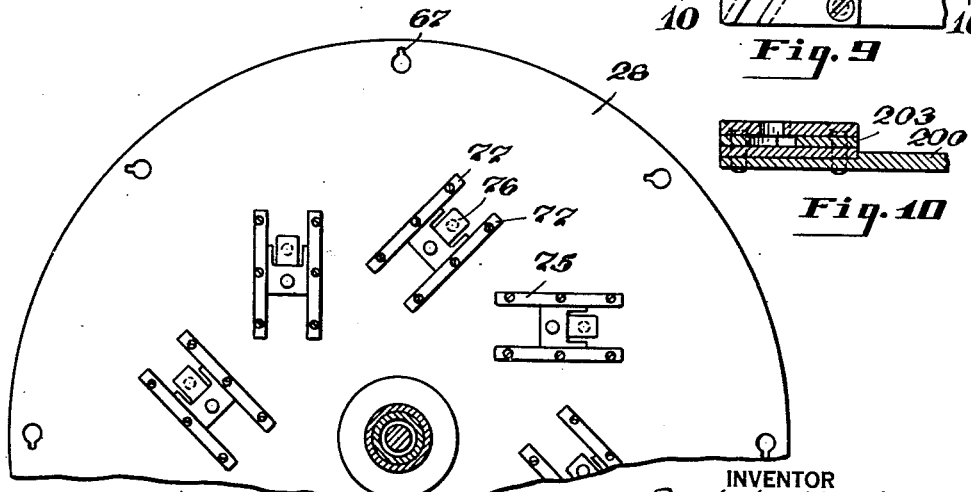
Fig. 8 is a bottom plan view of the turntable of the dispensing machine as viewed from line 8—8 in the direction of the arrows of Fig. 1, showing the arrangement of the dispensing valves.

Each of the containers 40 is provided with its own dispensing or metering valve assembly 75 secured to the underside of the rotary plate 28 (see Figures 8 to 10, inclusive, also Figures 26 and 27) for controlling the dispensing openings 76. The operation of these valves is an important feature of this invention. Each reservoir dispensing valve 75 comprises a pair of spaced parallel guides 77 (Fig. 26) having grooves 78 on their undersides adjacent the bottom of plate 28 for reception of a slide 79 carrying a depending stud 80. The valve per se consists of a knife-edge plate 81 (Fig. 12) spring-pressed into contact with the underside of the apertured rotary plate 28 through the medium of a leaf spring 83 held in engagement with the slide 79 by the underside of the stud 80 and extending outwardly and upwardly into contact with the lower face of the slide cut-off plate 81. The resilient member 83 is suitably secured to the cut-off plate 81 to insure its movement when slide plate 79 is reciprocated. The valve or cut-off plate 81 is adapted to be fully retracted from its normal overlying position over dispensing opening 76 or be only partially retracted, as will be hereinafter described, so that the material in the storage containers may flow in an unrestricted manner or be so controlled as to open and close the opening by stages or degrees.

The valve operating mechanism is combined with and automatically controlled by a liquid volume weighing apparatus shown in detail in Figures 11 to 22, inclusive. This weighing apparatus is mounted on a base plate 100 carried on the platform 5 and is readily accessible from the front of the dispensing machine. A casing 101 encloses the major portion of the apparatus and is secured to the vertical partition 102 set behind the front opening 103 so as to conceal the drive motor 17 and valve operating mechanism. The can weighing scale per se comprises a hollow vertical standard 105 on which is mounted a fulcrum 106 in the groove of which is pivoted a transverse knife edge 107 carrying spaced parallel arms of the scale beam 108. The extension 109 of the scale beam carries a second fulcrum 110 on which is mounted a second knife-edge 111 having an open, spaced vertical side walled gear casing 115 thereon. The bottom plate 116 of the gear casing 115 is provided with vertical bosses 117 for rotatively supporting a rotary shaft 118 having operating worm 119 fastened thereto and adapted to be turned by hand knob 120. The rear portion of the bottom plate 116 of the gear casing extends beyond the side walls thereof and terminates in a central upstanding cylinder 126 (Fig. 16) for guiding a vertical rod 121. The lower end of this guide rod is free and unsupported while its upper end is affixed to a horizontal bracket 122 encircling the lower portion of a multi-size can holder or platform 125. This can holder is provided with a plurality of decreasing diameter integral steps for supporting the bottom rims of various size cans ranging from ½ pint to 1 gallon capacity. The center of the can holder 125 is supported on a vertically adjustable rack bar 130 receiving movement from shaft 118 and worm 119.

Bearinged in the spaced vertical side walls of gear casing 115 are two horizontal shafts 131 and 132, the rear shaft 131 carrying a reduction gear 133 thereon meshing with worm 119 on shaft 118 and a larger gear 134 meshing with small diameter gear 135 carried on the front shaft 132. A second larger gear 136 is also carried on shaft 132 and meshes with the rack teeth 137 on vertical rack bar 130 for raising and lowering the same.

Thus, when rotary movement is imparted to hand knob 120, the can holder 125 is raised or lowered to position a can thereon directly under the selected base color dispensing valve openings 76 in plate 28. The weight of this entire mechanism is counterbalanced by a sliding weight 138 on the rear parallel scale beam bar 108 to compensate and balance the mass of the can holding device.

To more easily position the can holder 125 for receiving cans of various capacities under the dispensing valves 76, the front shaft 132 is provided with an indicator wheel 139 on its extreme left end on which is marked the capacities of several size cans, the markings being easily observed through a slight opening 140 formed in the front surface of the casing 101.

Figure 3B:
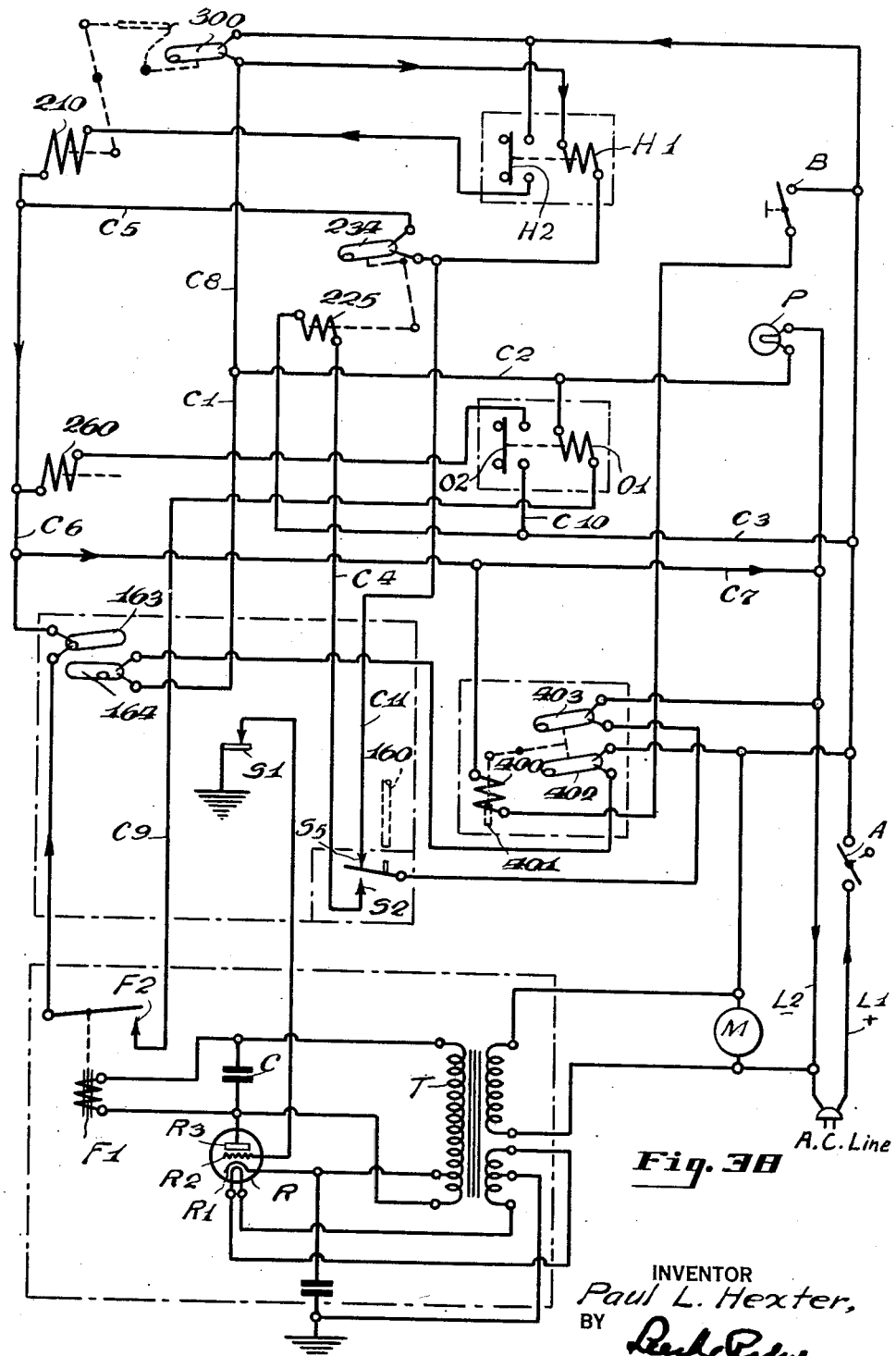
Fig. 3 is an enlarged front elevational view of the color selecting device with parts broken away and in section.

When it is desired to dispense a predetermined quantity of paint from the upper storage reservoirs 40, a can of any given size is fitted within its corresponding groove in the can holder 125 and the hand wheel 120 rotated to raise the can through the gearing and rack mechanism previously described until the can is in close proximity to the valve of the selected base color container which has been previously positioned thereabove by means of the indicating mechanism shown in Figure 3. The scale arm 108 is then released by moving the pivoted hand lever 450 mounted through the front casing away from stop pin 451; the lever 450 being pivotally connected to an arm 452 normally contacting pin 453. The horizontal arm 452 is provided with a lug 454 for holding the depending crank rod 455 secured to pivot arm 456. This mechanism is clearly shown in Figs. 11 and 12, where it is obvious that upon operation of the handle 450 the arm 456 is moved away from its contact with the scale beam 108 and permits the beam arm to pivot in a conventional manner on knife edge 106. The can support 125 is guided and steadied by means of the guide rod 121 the lower end of which is provided with a horizontal pivoted link 141 (Fig. 13) secured to a stud 142 positioned interiorly of the vertical standard 105 and extending through an elongated slot 143 formed in the side of the standard to permit movement of the link.

As before stated the weight of the service can positioning mechanism is initially counterbalanced through a slidable weight 138 positioned on the inner parallel beam arm 108' behind the wall of the casing 101. The outer parallel scale beam arm 108 extends through the wall of the casing 101 and terminates in a pointer 145 adjacent the gauge plate 146 affixed to the inside of the upper casing. To compensate for and counterbalance the weight of the empty service can in which the material is to be dispensed, an auxiliary scale beam 147 is provided which is affixed to the outer main scale beam 108 having a sliding weight 148 thereon whereby an accurate preliminary balance is secured. The exact weight of material to be deposited in the receiving can is determined by means of a series of detachably hanging weights 150 formed with a lower weight member 151 attached to a U-shaped strap 152 and serrated block 153 for engagement with the teeth 154 formed on the upper surface of the outer scale beam 108. It will be understood that the scale beam 108 and weights 150 are suitably calibrated so that their accurate relative positions can be obtained.

Affixed to the outer end of the main front scale beam 108 is a depending rod 160 which in depressed position, as shown in Figure 18, breaks the normal contact S5 (Fig. 38) of switch S2. This depending rod 160 carries an outwardly extending pin 162 for making and breaking the swinging contact 161 of the circuit switch S1 secured to the inner wall of the upper casing directly beneath the scale plate 146. Also operated by the pivoted movement of the scale beam are mercury switches 163 and 164 mounted in spring fingers secured to the outer face of a clip 165 which is held to the scale beam and knife edge 107. The details and operation of the several electrical circuits controlled by these several switches will be further explained hereinafter.

Figure 35:
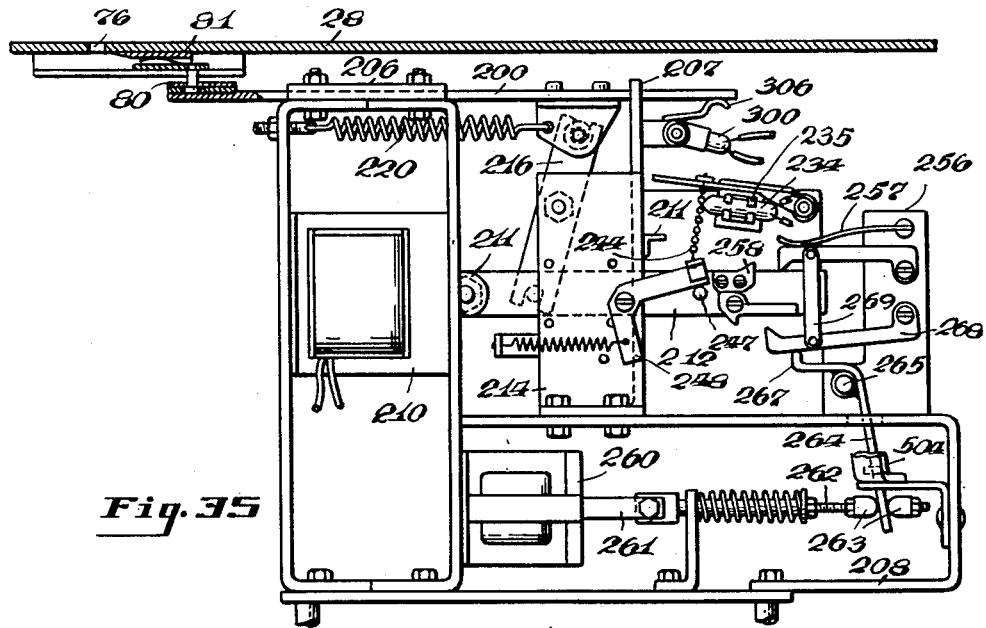
Fig. 35 is an elevational view of the valve operating mechanism similar to Fig. 24 but with the valve in full open position.
Figure 36:
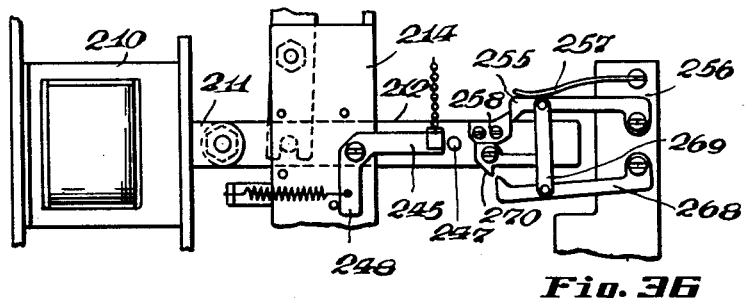
Fig. 36 is a fragmentary view of the valve operating bar of Fig. 35 in position for medium stream flow.
Figure 37:
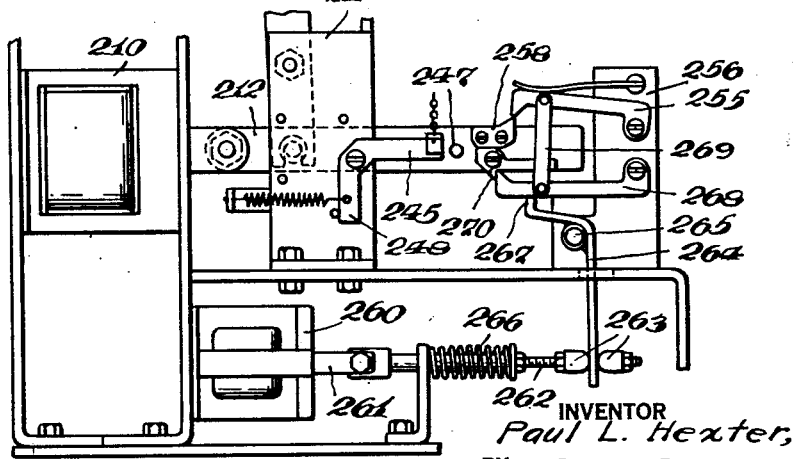
Fig. 37 is a fragmentary elevational view similar to Fig. 24 showing the valve operating bar in position for fine stream flow.

Referring now to the automatic mechanism for opening and closing the sliding valve plates 61 and their associated mechanisms, reference is had to Figures 23 to 37, inclusive. Here it will be seen that the studs 80 depending below each valve are adapted to be engaged and disengaged by the reciprocating movement of a positively actuated bar 200 (Fig. 35). The outer end of the bar 200 is provided with a series of vertically arranged plates including a pair of spaced outer plates 201 (Fig. 9) having an arcuate or cam slot 202 formed therebetween. The adjacent lower plates 203 (Fig. 10) are also arcuately spaced with a wider slot than the top plates for engagement with the enlarged head of the stud 80. Thus, when the bar 200 is reciprocated the cam slots in the plates 201 and 203 first engage the shank and head of the stud 80 and continued movement either opens or closes the valve plate 81 covering the discharge opening 76. The valve operating mechanism is mounted in the inner portion of the upper casing in such a manner that the bar 200 has a straight line forward and rearward movement for engagement with and operation of the dispensing valves. It should be here stated that one of the salient features of the present valve actuating mechanism is the succession of positions assumed by the valve plate in opening and closing a selected dispensing opening 76. Normally the valve mechanism is operated in such a manner that the valve plate or knife 81 is initially and fully retracted from its closed position over the dispensing opening so that at the start of the dispensing operation the material from the upper reservoir flows in a comparatively large stream through the valve opening and thereafter the operating mechanism includes means for serially moving the valve plate 81 to partially cover the opening and before the total quantity of material is deposited, further movement is given the valve plate to restrict the flow of liquid to a mere trickle before the final movement of completely closing-off the opening. This series of steps in closing the valve is shown in enlarged Figures 28, 29 and 30.

Referring again to the valve actuating bar 200, Figure 24 shows the mechanism with the valve in fully closed position with the valve plate covering a discharge opening and the stud 80 in position relative to the operator carried on the end of the bar. The actuating bar is held in position on the top of an open frame 205 by a guide bracket 206 through which it may reciprocate. A rearward vertical guide bar 207 having a suitable slot therein for supporting the bar 200 is arranged rearwardly of the frame 205 and is carried on a lower horizontal open frame 208 joined thereto. Positioned within the open frame 205 is a main operating solenoid 210 having an armature 211 pivotally secured to a rearwardly extending arm 212. This arm is supported in horizontal guide brackets 213 bolted to a vertical side plate 214 carried on the upper portion of the lower horizontal frame 208. A laterally extending stud or pin 215 formed on the arm 212 is embraced by the bifurcated lower end of link 216 pivotally mounted on spaced bolt 217 threaded into the upper portion of side plate 214. The upper end of the bar 216 is also bifurcated for engagement with the shank of a stud 218 threaded into depending bracket 219 bolted to the reciprocating bar 200. A coil spring 220 affixed to the side of the vertical frame 205 is also attached to the depending bracket 219 to normally urge the operating bar 200 into valve-closing position. However, when the main solenoid 210 is energized, it draws its armature 211 and associated arm 212 inwardly to move the link 216 against the tension of the spring 220 and thus permits the valve plate 81 to uncover the dispensing valve opening 76. A mercury 300, held in spring fingers 301 is mounted below the plane of valve actuating bar 200, and as shown in detail in Figs. 31, 32 and 33, the switch holding fingers are carried on plate 302, which is pivoted on shaft 303 passing through the offset arm 304 secured to vertical arm 207. Tilting movement is given the shaft 303 and the associated mercury switch 300 by offset spring arm 306 having its upper end normally lying in the horizontal plane of bar 200, whereupon the switch is tilted to close the circuit thereof when the valve bar 200 is retracted to open the dispensing valve 81 and thus the circuit controlled by the switch 300 is closed until the valve arm again moves the valve to shut position and the spring arm 306 rises above the plane of the arm 200.

As the bulk of the material from the reservoirs is dispensed into the receiving can, the scale beam will be tipped upwardly by the weight of the material and due to an electrical switch arrangement, which will hereinafter be described in detail, an electrical circuit is completed to deenergize main solenoid 210 and energize auxiliary solenoid 225 having an armature 226 and pivoted rod 227 attached thereto. This arm passes through an opening in the lower end of bell crank 228 (Fig. 31) having an arm 229 normally biased and drawn downwardly by coil spring 230 having its end secured to a bracket 231. The bell crank 228 is pivoted at 232 on a pin secured to the upright 233. Also carried on the pivot pin 232 on the opposite side of the upright 233 is a mercury switch 234 held in spring fingers 235. The switch holding means is equipped with a projecting arm 240 extending downwardly for engagement with a stop-step 241. A laterally extending secondary arm 243 is secured to the arm 240 with a chain 244 joining its end and the end of a second bell crank 245 pivoted at 246. The short vertical arm 248 of the bell crank 245 is attached to a coil spring 249 the opposite end of which passes through a bracket 250 to insure that normally the longer arm 245 of the second bell crank 245 is in horizontal position and this, in turn, keeps the arm 240 against the stop 241. However, when the armature 225 is energized and the pivoted arm 227 is retracted, the tension of the coil springs 230 and 240 are overcome and both bell cranks 228 and 245 are rocked on their pivot points. This movement also completes the circuit controlled by tilting the mercury switch 234 and as the switch controlling the main armature 210 has been operated to deenergize the same, the coil spring 220 pulls the slide bar 200 to partially close the dispensing opening 76. Simultaneously with the deenergization of main armature 211, the pivoted link 216 through the action of coil spring 220 urges the arm 212 of the solenoid to the right, where an upper latch member 255, pivoted to rear bracket 256 and normally pressed downwardly by leaf spring 257, engages the dog 258 carried on the upper part of the arm 212 (see Figures 35, 36 and 37).

As the scale beam 108 again moves upwardly, it breaks the circuit of the auxiliary armature 225 and completes the circuit through solenoid 260 having an armature 261 and pivoted arm 262 connected by spaced abutments 263 on the end thereof and between which is arranged the lower end of a pivoted crank 264 carried on pivot pin 265 attached to the rear bracket 256. The solenoid 260 and its associated armature work against the tension of spring 266, so that, when the solenoid 260 is energized, it draws the arm 261 to the left and moves abutments 263, thereby urging crank 264 to pivot on pin 265 and raises the upwardly extending finger portion 267 thereof for engagement with lower link arm 268 connected to the upper link arm by pivoted connector 269. This movement of crank 264 raises lower latch arm 268 and through connector 269 also raises upper latch arm 255 from engagement with dog 258, whereupon the spring 220 forces the valve operating rod 200 to the left to partially close the valve 76, as indicated in Figure 29. The valve is not completely closed as movement of the rod 200 is arrested by the engagement of lower latch 268 with lower dog 270. It is obvious that when this partial valve closing movement occurs the stream of material will be reduced and the can will fill more slowly than before.

The valve is closed when the swinging arm of switch S₁ is closed by pin 162 carried on depending rod 160 affixed to the scale beam as the beam rises and reaches its original zero or balanced position. The final closing of the dispensing valve and severing of the minute stream flowing is caused by the de-energization of the solenoid 260, which releases the lower dog 270, that has heretofore held the valve in slightly open position. When this action occurs the valve is finally closed by the action of spring 220, and thus the exact amount of paint has been dispensed into the can held on the scale platform. The same action as heretofore described takes place when the next material is deposited into the can, and so on until the several ingredients have been deposited. In actual use it is customary for the operator to be provided with a formula book giving him the proportions by weight of the several base colors necessary for producing the particular desired shade of coating material. This is of particular advantage in service shops where automobile fenders and bodies are repaired and refinished, as it is well known that from year to year the various car manufacturers change their color finishes and consequently a very accurate mixing of the base paints to create the color desired is essential. The present machine is the complete answer to this problem.

Many times it is necessary for the operator to measure out very small quantities of paint, as for instance when he only wishes an ounce or so of material for retouching some slight repair job or blemish. It is obvious that when such small amounts of paint are to be dispensed the fully open valve position would permit an excess amount of material to flow through the valve before the valve would close to the medium and subsequent small streams. To prevent this and because of the difficulty in weighing small quantities of material due to the weight of the stream per se laying between the surface of the paint in the can and the dispensing valve, it is most desirable to make provision to limit the initial flow to the medium stream and then close the stream down to its smallest position. As will be described in detail in explaining the operation of the electrical circuit, this safety feature is taken care of by the present machine. Generally speaking, when small amounts of paint are to be dispensed the solenoid 210 is energized to open the valve, but the solenoid 225 is not energized and consequently the L-shaped stop arm 245 is not lifted out of its engagement with pin 247 secured to the solenoid bar 212 by the depending chain 244. The stop pin 247 limits the movement of the main valve 212 to prevent its opening further than its medium position. The ensuing operations are identical to those before described.

Figure 7:
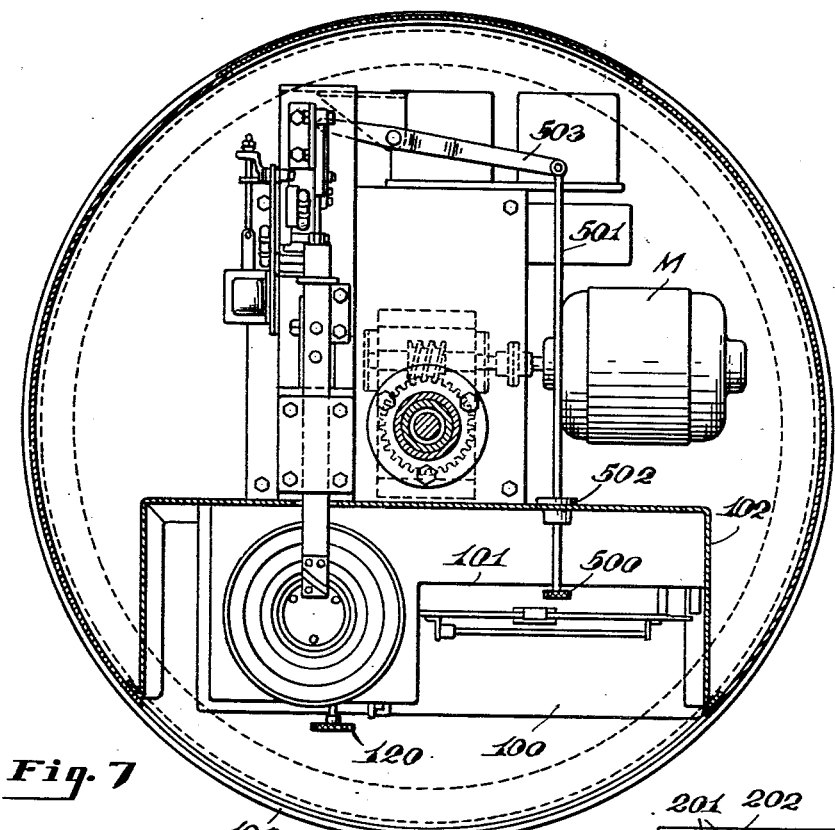
Fig. 7 is a sectional view in plan, as viewed from the line 7—7 in the direction of the arrows of Fig. 1.

In the event that a power failure occurs during the dispensing operation, it is desirable for the operator to be able to instantly close the valve 81 to prevent wasting material. Such a safety device is incorporated in the machine for manually closing the dispensing valve and comprises a readily accessible push button 500 (Fig. 7) mounted on the front panel directly below the main switch B.

The button 500 is fastened to the end of a horizontal rod 501 mounted in a bushing 502 and extends rearwardly to a pivoted link arm 503. The opposite end of the arm 503 is offset at 504 and provided with an aperture for encompassing the lower end of crank 264 (see Fig. 35). Thus, in an emergency, the push button 500 is depressed and through its linkage operates the crank 264.

In operation, (Figs. 6 and 38) closing the main switch A starts the motor M to operate the shaft 10 of the paint container mechanism 47. Transformer T is also energized when main switch A is closed, causing the vacuum tube R and its elements R1, R2 and R3 to become energized. The purpose of the vacuum tube and its associated circuits is to provide a very sensitive control whereby the paint dispensing valve 81 will completely close instantly when the scale beam 108 reaches its horizontal or zero position after receiving the desired quantity of paint. This minute control and sensitivity of operation is due in part to the extremely light contact switch S1 (Fig. 18), which is grounded when the scale beam 108 lifts the vertical rod 160 from the point of switch S1 in the grid circuit of the vacuum tube which is so small that a very lightly constructed switch is sufficient for practical operation.

In the circuit diagram, Figure 38, the main circuits are illustrated in open position with the scale beam 108 horizontal with the pointer and the electrical contact S1 closed. However, as soon as the scale rider 150 is set and the scale beam goes down, switch S1 is opened and the circuit control by switch S2 is closed by movement of rod 160. As soon as contact S1 is opened, the ground connection of the tube grid circuit R2 is broken with the result that the circuit from the tube R does not interfere with the transformer supply current to the armature F1 of solenoid switch F2, and as soon as switch A is closed, the solenoid F1 is energized to close switch F2 although no current flows therethrough at this time.

For purposes of description, it will be assumed that the wiring leading from the power plug is positive and negative as indicated. The operator sets the apparatus into operation to start the dispensing process by closing switch button B. When the push button switch B is closed, current in the power line flows through main switches A and B through solenoid 400 and back to L2. With solenoid 400 energized, the armature 401 thereof operates and mercury switches 402 and 403 are tipped into closed circuit position and current then flows from L1 through mercury switch 402 and also mercury switch 164 mounted on the scale beam and which has been tipped into contact position. This energy also passes through wiring C1 and C2 to energize pilot light P and thence to line L2. At the same time current flows through conductor C3 from L1 to solenoid 225 through conductor C4, switch point S2 and mercury switch 403 to L2. With solenoid 225 energized, mercoid 234 is tipped to closed circuit position and current may then flow through wiring C1 and C8 (already carrying current) through solenoid H1, mercury switch 234, conductors C5, C6 and C7 to line L2. When the solenoid H1 is energized, current from L1 flows through contact bar H2 to energize main valve operating solenoid 210 and thence through conductors C6 and C7 to line L2. Thus the dispensing valve is fully opened by retraction of valve bar 200 through the movement of armature 211 of solenoid 210. As soon as solenoid 210 is energized, the operating switch B no longer needs to be held closed for current then flows from L1 through mercury switches 234, 300 and relay solenoid H1, thus keeping solenoid 210 energized until mercoids 234, 300 are tipped to open position. The pilot light P is energized as soon as solenoid 210 is energized and the operator may cease holding switch B closed. As the scale beam 108 begins to rise, lower contact S2 is broken and the upper contact S5 is closed so that solenoid 225 is de-energized and mercury switch 234 tipped to open position, thus de-energizing relay H1 and solenoid 210.

At this point the dogs or stops 258 and 270 that are mechanically associated with the main valve bar 200 function to arrest the movement of the bar so that the valve 81 moves from its previous full open position (Fig. 28) to an intermediate or semi-blocked position (Fig. 29) and consequently the volume of the paint stream is materially reduced. Finally, mercury switch 163, which was put in open position when the scale beam descended, closes as the scale beam continues to rise, whereupon current flows from L1 through mercoid 300 and conductors C8—C2 to solenoid O1. This circuit continues through conductors C10, C9 and contact F2 which had been previously closed when main power switch A was closed and thence through mercury switch 163 and conductors C7—L2.

When the intermediate solenoid O1 is energized, current flows from L1 through conductors C2—C10, relay contact bar O2, solenoid 260, conductors C6 and C7 to L2. As soon as solenoid 260 is energized, it shifts the upper locking dog 255 out of engagement with the solenoid bar 212 and interposes the lower lock dog 270 to stop the valve opening down to its smallest position (Fig. 30) to allow only a very fine stream to continue filling the can.

The final electrical action to completely close the valve takes place when the contact S1 is closed by pin 162 as the scale beam rises and reaches its original horizontal or zero condition. Closing of contact S1 grounds the grid R2 of the vacuum tube R and neutralizes the power transformer solenoid circuit and consequently the solenoid F1 is substantially deenergized, and allows contact F2 to open. Current then flowing from L1 through mercury switch 300, conductors C8—C2, solenoid O1, conductor C9, mercury switch 163 and conductor C7 is interrupted, thus deenergizing solenoid 260. This releases the lower dog 270 holding the valve slightly open and permits the valve to completely close under the action of spring 220. This completes the cycle for one dispensing operation.

When it is desired to measure small amounts of paint, the full open valve position would allow an excessive amount to flow through before the mechanism could move the valve to the medium stream. To guard against this eventuality, provision is made to limit the initial flow to the medium stream when the operating switch B is closed. If the amount of paint to be measured is less than 1 oz. the scale beam does not go down far enough to close contact S2 and contact S5 remains closed. Then the cycle of operation is as follows:

Push button B is closed and current flows through solenoid 400, C7 to L2, thus tipping mercury switches 402 and 403. Then current flows through 402, 164, C1, C2 and P to L2. Also, current flows from C1 (already carrying current), through H1, C11, contact S5, mercury switch 403 to L2. Thus solenoid 210 is energized to open the valve but with this difference, namely the solenoid 225 has not been energized. Since 225 was not energized the L-shaped stop arm 245 was not lifted out of engagement with the pin 247 on the solenoid bar 212 by the chain 244. The pin 247 limits movement of the solenoid bar 212 so that the valve 81 does not open further than medium position. Hence the full stream is not dispensed, and the paint measuring starts on the medium stream. Subsequent operations are the same as previously described, the valve closing down to the 3/32" opening and finally closing off completely when contact S1 is closed.

Thus, a paint mixing machine having numerous practical advantages and novel features is here disclosed and claimed.

I claim:

1. A paint dispensing apparatus including, in combination, a horizontal rotatable platform, a plurality of circularly arranged paint containers thereon, individual dispensing valves for each of said containers affixed to the underside of said platform, a service can support for holding a service can positioned below the path of said dispensing valves when the said platform is rotated, a retractable latch engaging said platform at stations throughout its circumference corresponding to the discharge positions of the said individual dispensing valves into a service can on said support and means operable only when said latch is in engagement with said platform for opening and closing the paint container dispensing valve retained in discharge position by said latch.

2. In a paint dispensing apparatus as defined in claim 1 wherein the means for opening and closing the said dispensing valve is detachably connected thereto.

3. A paint dispensing mechanism including in combination a horizontal rotatable platform, a plurality of paint holding containers positioned thereon, individual dispensing valves for such containers formed on said platform, a service can weighing scale mounted in the path of said individual valves, means for positioning a selected paint container valve in dispensing relation to a service can placed on the said weighing scale, a valve operator for opening and closing a selected dispensing valve, said valve operator being controlled by the service can weighing scale, and wherein said rotatable platform holding the plurality of paint containers is secured to a vertical hollow shaft mounted for free rotation on an antifriction bearing whereby the desired paint holding container and its associated dispensing valve may be manually adjustably positioned above a service can on the weighing scale and a locking device for securing the said rotatable platform in adjusted position.

4. A paint dispensing mechanism as defined in claim 3 wherein the said rotatable platform holding the plurality of paint containers is secured to a freely rotatable vertical hollow shaft, a driven shaft extends upwardly throughout said hollow shaft to above the paint holding containers, and rotatable agitators are mounted through the tops of said paint holding containers with means for rotating said agitators from the said vertical driven shaft.

5. A paint dispensing machine as defined in claim 3 wherein the rotatable platform carrying the paint holding containers is freely rotatable to position the selected container and its associated dispensing valve in dispensing relation to a service can, said platform being held in dispensing relation thereto by a retractable rotatable bolt having a side key thereon cooperating with openings in the said platform adjacent each of the said paint holding containers, indicia rotatable with the bolt corresponding to the several paint holding containers, the opening in the platform having radial keyways corresponding to the indicia rotatable with the bolt.

6. A paint dispensing machine as defined in claim 3 wherein the rotatable platform carrying the paint holding containers is mounted on a freely rotatable vertical shaft and the platform is held in non-rotatable position by means of a vertically retractable bolt cooperating with openings in the said platform, a radial key is formed on said bolt and a collar having indicia corresponding to the various paint containers is carried on and rotatable with said bolt, said radial key being adapted to only pass through the opening in the platform adjacent the desired paint container corresponding to the indicia on the said collar.

7. A paint dispensing machine as defined in claim 3 wherein each of the paint holding containers on the rotatable platform are provided with covers having vertical bearings passing therethrough with shafts mounted in said bearings, drive pulleys secured to the outer ends of said shaft, agitating blades secured to the inner ends of said shaft depending into the lower portions of the paint containers adjacent the said platform and a power driven shaft extending vertically through the center of said rotatable platform for rotating said drive pulleys.

8. A paint dispensing apparatus including in combination, a plurality of paint holding containers mounted on a horizontal rotatable platform, a series of individual dispensing valves for said paint containers secured to the under side of said platform, a weighing mechanism placed in the path of said series of valves, means for supporting a service can on said weighing mechanism and a detachable valve opening and closing mechanism controlled by said weighing mechanism adapted to engage the valve of the paint container adjacent the service can and means controlled by the weight of the paint dispensed into the service can for closing said dispensing valve, and wherein the means for supporting a service can on the weighing mechanism comprises a vertically adjustable platform having a series of decreasing diameter steps formed therein for holding corresponding diameter cans and a manual operator for raising said platform to position a service can thereon adjacent one of the said individual dispensing valves.

9. A paint dispensing apparatus as defined in claim 8 wherein the said weighing mechanism consists of a pivoted scale beam and the service can supporting means thereon comprises an adjustable platform carried on a rack bar engaging a manually rotatable gear meshing therewith for raising and lowering the platform, the entire can supporting means being pivotally mounted on the rear end of said scale beam.

10. A paint dispensing apparatus as defined in claim 8 wherein the individually dispensing valves comprise slidable plates secured in side guides mounted on the underside of said rotatable platform in the parallel plane thereof, said slidable plates controlling flow openings in said platform communicating with said paint holding containers.

11. A paint dispensing apparatus as defined in claim 8 wherein the paint holding containers comprise transparent cylinders directly secured to the rotatable platform above bottom discharge openings formed therethrough and the individual dispensing valves comprise retractable knife blades in contact with the underside of said platform and normally covering said bottom discharge openings.

12. A paint dispensing apparatus as defined in claim 8 wherein the individual dispensing means include discharge openings passing through the rotatable platform and the flow control valves are provided with slidable spring pressed knife blades supported in side frames on the underside of said platform with depending studs carried by the knife blades for detachable engagement by the valve opening and closing mechanism.

13. A paint dispensing apparatus as defined in claim 8 wherein the individual dispensing valves are slidable plates having knife edges for controlling paint discharge openings in the rotatable platform, said slidable plates being provided with depending headed stubs for selective engagement with an arcuate slot carried by a reciprocating bar whereby the slidable plates cover and uncover the paint discharge openings only when the selected valve is directly above the service can.

14. A paint dispensing mechanism as defined in claim 3 wherein the said valve operator for opening and closing the selected dispensing valve consists of a spring biased bar carrying a sliding knife edge normally maintaining the valve in closed position, a solenoid adapted to be energized by an electrical circuit controlled by movement of the weighing scales whereby said bar is retracted to withdraw the knife blade and open the valve, a plurality of intermediate stops on said bar whereby said knife blade may be held partially covering said valve, additional solenoids having circuits controlled by the weighing scales adapted to be progressively energized and deenergized following deenergization of the first mentioned solenoid, said additional solenoids operating latches cooperating with said bar stops whereby the spring biased valve bar is serially closed.

15. A paint dispensing mechanism as defined in claim 3 wherein the valve operator for opening and closing the selected dispensing valve comprises a horizontally slidable knife edge detachably connectable to a horizontally retractable spring biased bar, a solenoid having an armature spaced below said bar and joined thereto by a pivoted link, means including an electrical circuit controlled by the weighing scales for energizing said solenoid whereby said link is pivoted to retract said bar against the spring bias and connect said bar with the knife edge to uncover said dispensing valve, a series of stops and cooperating latches engaging said armature after retraction of the said bar and preventing the return thereof following opening of said valve and electrical means also controlled by said weighing scales for operating said latches to serially allow said bar and knife blade to close the said dispensing valve.

16. A paint dispensing mechanism as defined in claim 3 wherein the valve operator for opening and closing the selected dispensing valve comprises a spring biased retractable bar having a valve connecting member thereon whereby the selected valve is engaged and opened by said connecting member when the said bar is retracted, a plurality of latches preventing the retrograde movement of said bar after its initial retraction, electrical means controlled by the weighing scales for serially and progressively releasing said latches permitting the operating bar to return to its original position and additional manual means for restoring the original position of the bar and the valve engaged thereby.

PAUL L. HEXTER.